Aug. 7, 1956  H. MUSLY  2,757,731
BLOOM AND SLAB SHEARS
Filed Aug. 26, 1954
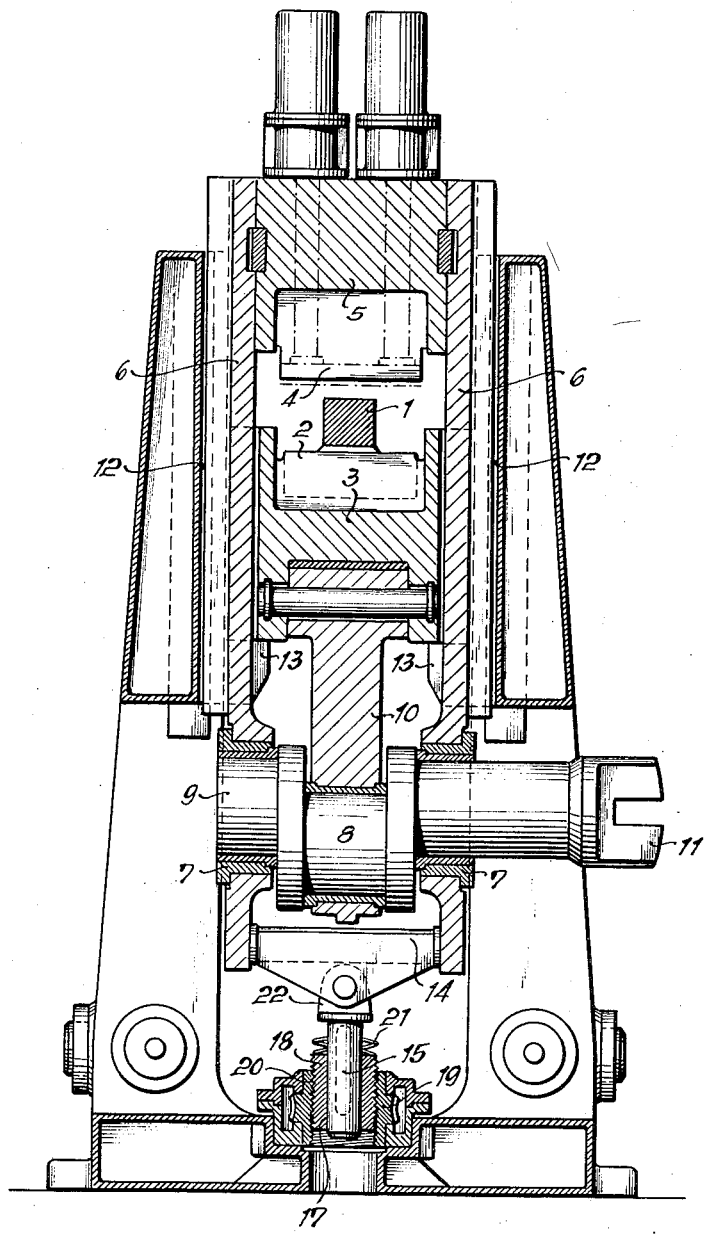
INVENTOR
H. Musly United States Patent Office 2,757,731
Patented Aug. 7, 1956

2,757,731

BLOOM AND SLAB SHEARS

Hans Musly, Dusseldorf, Germany, assignor to Schloemann Aktiengesellschaft, Dusseldorf, Germany Application August 26, 1954, Serial No. 452,377

Claims priority, application Germany October 5, 1953

3 Claims. (Cl. 164—47)

Shears are known in which the cutting system is guided in the vertical direction so as to be freely movable in the shear housing. The mode of operation of shears of this kind is as follows: On the cutting system being put into operation, first of all the top cutter comes to bear under the dead weight of the cutting system on the material to be sheared. Only then can the bottom cutter rise and perform the shearing action. As bloom and slab shears have to exert great cutting powers, the weight of the constructional parts of the cutting system is correspondingly great. Besides the weight of the material to be sheared the roller track of the shears has to take the weight of the constructional parts of the cutting system and the impacts occurring with the descent of the cutting system on to the material to be sheared and with the cut itself. This loading makes a very sturdy construction of the roller track of the shears essential. Nevertheless, frequent stoppages due to failures of the roller track of the shears are unavoidable.

Shears are known, it is true, in which the bottom cutter comes to rest on a fixed stop, whereby the deepest position of the bottom cutter is determined. On the cut taking place, however, the top cutter descends till it rests on the material to be cut, so that the roller track of the shears is subjected to the same detrimental loadings, as in the case of the previously mentioned construction.

These disadvantages have been known for a long time and there is no lack of constructions for overcoming these disadvantages. This group of shears employs a vertically adjustable top cutter or a cutting system which is displaceable in the vertical direction. With the object of protecting the roller track from unduly high stressing, it has been necessary to tolerate the disadvantage that the top cutter has its position determined by its displacement or by the displacement of the cutting system and can only be brought to full clearance by altering the displacement. Such a displacement causes loss of time. As, however, the adjustment has to be carried out frequently, for instance when a bloom has to be introduced with its thickened head end into the jaw of the shears, there are stoppages which considerably reduce the possible number of cuts of the shears.

Through the present invention the disadvantages of both shear constructions are overcome.

According to the present invention it is proposed in the case of shears with a cutting system which is freely movable in the vertical direction to provide a fixed stop for limiting the downward motion of the bottom cutter and an adjustable stop for limiting the downward motion of the upper cutter. Whilst the invention is applicable to shears with a cutting system of various constructions, which is self-contained, the invention applies more particularly to shears, the cutting system of which consists of a crank-shaft, the bottom cutter actuated by the crank-shaft and the top cutter connected with the crank-shaft bearing by way of tension members. In shears of this kind the adjustable stop for limiting the downward motion of the bottom cutter is preferably disposed below the cutting system, the tension members which connect the top cutter with the crank shaft bearing being supported by suitable means on the adjustable stop.

Further details of the invention shall now be described with reference to the accompanying drawing which shows a constructional example of the invention.

1 is the material to be cut. The bottom cutter 2 is inserted in the bottom cutter carrier 3 and the top cutter 4 in the top cutter carrier 5. The top cutter carrier 5 is connected by way of the tension member 6 with the crank-shaft bearings 7. The crank pin 8 of the crank-shaft 9 is connected by way of the push rod 10 with the bottom cutter carrier 2. The crank-shaft 9 is driven by gearing (not shown) by way of a hinged spindle which engages with the flat pin 11. The cutting system is guided in the vertical direction so as to move freely in guides 12 of the shear housing. The stops 13 limit the downward motion of the bottom cutter. For limiting the downward motion of the top cutter the tension members 6 are connected by a yoke piece 14. The yoke piece 14 supports a collar bolt 15, the shank of which is guided in the bore 17 of the adjustable stop piece 18. The stop piece 18 is displaced by turning the worm wheel 19. For this purpose the stop piece 18 engages with a thread 20 in the worm wheel 19 and is guided nonrotatably with respect to the collar bolt 15. In order to cause the cutting system to come down gently on to the stop piece 18, spring washers 21 are provided. Similar springing can also be provided at the stops 13.

The shears operate in the following manner:

In the position shown in the drawing the shears are at the greatest distance from one another. On the crank-shaft turning, first of all the top cutter carrier 5 will descend, until the collar 22 of the collar bolt 15 rests by way of the springs 21 on the stop piece 18. The stop piece 18 is adjusted in such a manner that the top cutter 4 will come to rest just above the material 1 to be cut. On the crank shaft 9 continuing to turn, the bottom cutter carrier 3 will move upwards, when it will lift off the stops 13 and the bottom cutter 2 will cut through the material from below. On further cuts taking place, the crank-shaft 9 need no longer perform a complete revolution, but only rocking motions within the last-named turning range. When the shears opening is to be completely opened again, however, it is only necessary for the crank-shaft 9 to be turned back into the initial position. In the transition from the smaller to the full shears opening no adjustments of the cutting system are therefore required, but only a rotation of the crank-shaft 9 into its bottom dead centre position.

It is to be understood that the invention can also be applied to other cutting systems and is therefore in no way limited to the constructional example illustrated.

I claim:

1. Bloom and slab shears, comprising: a shear stand, and a cutting system freely guided vertically up and down in the shear stand, the cutting system including: an upper cutter-carrier, an upper cutter carried by the upper cutter-carrier, tension bars rigidly connected with the upper cutter-carrier, a crank shaft journaled in the said tension bars, a lower cutter-carrier freely guided vertically up and down in the said tension bars, a lower cutter carried by the lower cutter-carrier, a thrust rod pivotally connecting the crank pin of the crank shaft with the lower cutter-carrier, a stop fixed to the shear stand limiting the downward movement of the lower cutter-carrier, and an adjustable stop provided on the shear stand limiting the downward movement of the upper cutter-carrier.

2. Bloom and slab shears as claimed in claim 1, the said adjustable stop comprising: an internally screw-threaded worm gear journaled with its axis vertical in the shear stand, an externally screw-threaded and axially bored stop piece extending through and meshing with the screw thread of the worm gear, a worm journaled in the shear stand for rotating the worm gear and thereby raising or lowering the stop piece, a collar bolt engaging in the axial bore of the stop piece, a yoke connecting the tension bars with one another, and a pivotal connection between the collar bolt and the yoke.

3. Bloom and slab shears as claimed in claim 2, further comprising a resilient cushion interposed between the collar of the collar bolt and the top of the stop piece.

References Cited in the file of this patent

UNITED STATES PATENTS 2,043,398  Smitmans _____ June 9, 1936

FOREIGN PATENTS 650,581  Great Britain _____ Feb. 28, 1951